Sept. 2, 1958     A. A. OBERMAIER     2,849,880
THERMAL ANEMOMETERS
Filed Dec. 28, 1953     2 Sheets-Sheet 1
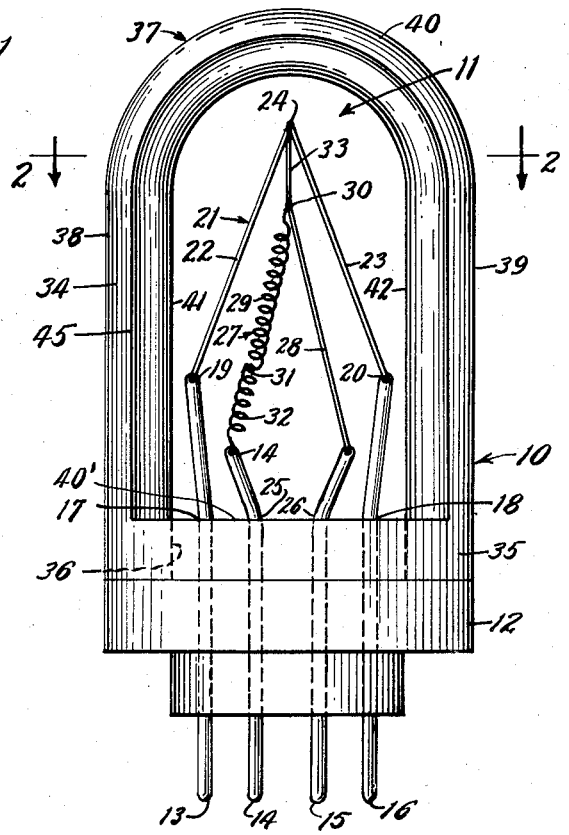
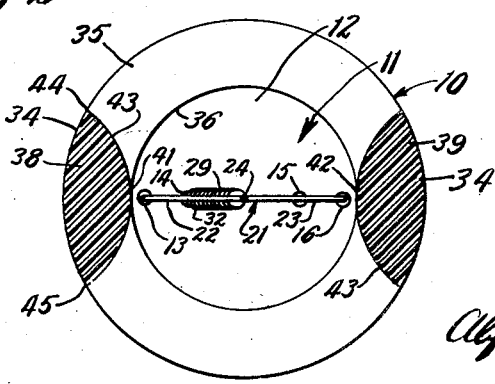
INVENTOR.
Alfred A. Obermaier
BY
Robert H. Wendt
Atty.

Sept. 2, 1958     A. A. OBERMAIER     2,849,880
THERMAL ANEMOMETERS
Filed Dec. 28, 1953     2 Sheets-Sheet 2
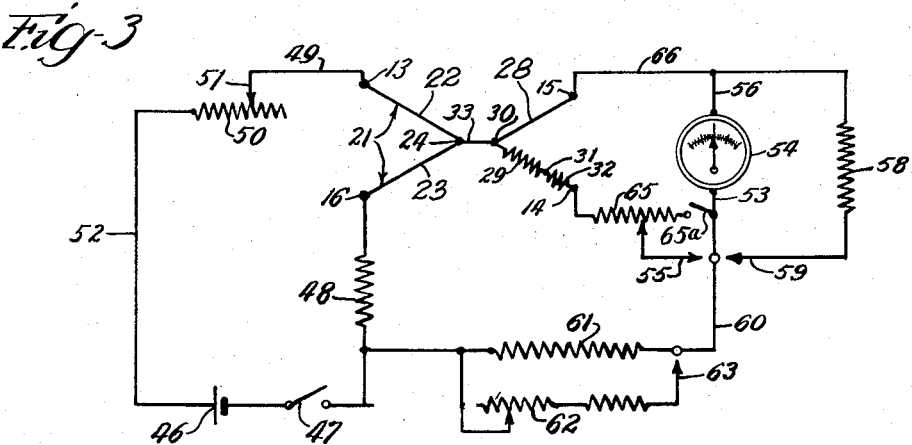
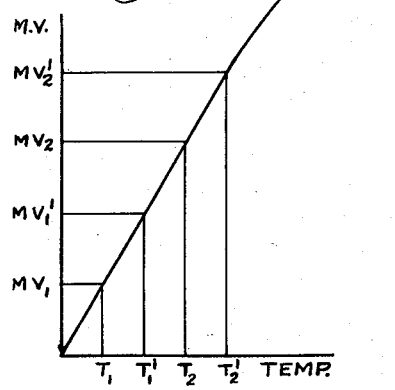
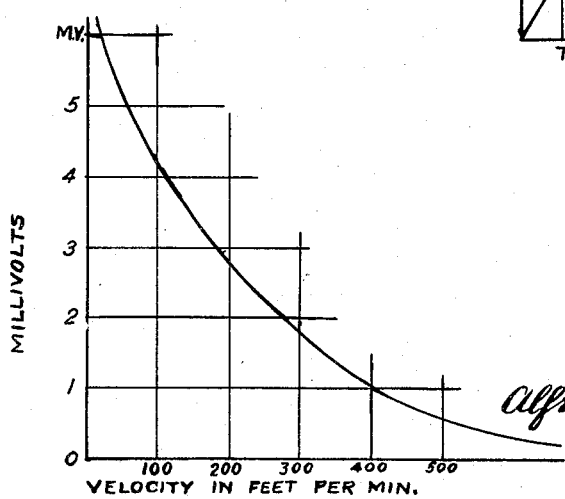
INVENTOR.
Alfred A. Obermaier
BY
Robert H. Wendt
Atty.

United States Patent Office 2,849,880
Patented Sept. 2, 1958

2,849,880
THERMAL ANEMOMETERS

Alfred A. Obermaier, Park Ridge, Ill., assignor to Illinois Testing Laboratories, Inc., Chicago, Ill., a corporation of Illinois Application December 28, 1953, Serial No. 400,672

7 Claims. (Cl. 73—204)

The present invention relates to thermal anemometers, and is particularly concerned with thermal anemometers of the type employing a thermocouple in the measuring of fluid or gaseous flow by means of a heated wire device.

The principle involved is that the velocity of flow of the fluid or gaseous medium bears a direct relation to the temperature of the heated wire that is placed in the flowing medium.

The cooling effect of the fluid medium which flows past the heated wire may be expressed in the equation $$T = \frac{k}{V^c}$$

where T is the temperature of the wire, V is the velocity of the fluid medium at that temperature; and $k$ and $c$ are constants, the value of which depends on the medium, the temperature measuring device, and the heat transfer to the temperature measuring device.

The present invention proposes to measure the temperature of the heated wire by means of a thermocouple; and the following are the objects of the present invention:

One of the objects of the invention is the provision of an improved thermal anemometer in which the measuring element is less dependent upon fluid or gaseous temperatures or, conversely, is more nearly immune to differences of fluid or gaseous temperatures.

Another object is to control the sensitivity of the instrument or the slope of the MV curve by utilizing the spacing of the heater from the hot junction.

Another object of the invention is the provision of an improved measuring element for thermal anemometers having an increased sensitivity which is caused by locating the thermal element in a cap with a through opening that is shaped like a Venturi tube for increasing the velocity of movement of the gaseous medium at the throat of the Venturi, where the thermal element is located.

Another object of the invention is the provision of an improved measuring system for thermal anemometers of the type employing a thermocouple which is so arranged that the E. M. F. of the thermocouple may be suitably suppressed by a portion of the battery voltage that supplies the heater current; and the provision of means to measure the current supplied to the heater and to adjust the current to a fixed value, both of which may be accomplished by the use of a single battery supply and a single meter with a minimum of switching.

Other objects and advantages of the invention will be apparent from the following description and the accompanying drawings, in which similar characters of reference indicate similar parts throughout the several views.

Referring to the two sheets of drawings accompanying this specification:

Fig. 1 is a side elevational view of a thermal anemometer embodying my invention;

Fig. 2 is a sectional view taken on the plane of the line 2—2;

Fig. 3 is a wiring diagram showing the circuit used for the anemometer;

Fig. 4 is a view illustrating a millivolt-temperature curve used in explaining the invention;

Fig. 5 is a view illustrating a millivolt-velocity curve used in explaining the invention.

Referring to Fig. 1, 10 indicates in its entirety the sensitive instrument of the thermal anemometer, which is adapted to be held in the air stream, preferably with the plane of the opening 11 extending substantially at right angles to the direction of movement of the air.

The instrument includes a suitable insulating base 12, which may support a plurality of leads 13, 14, 15, and 16 passing through the base. The outermost leads 13 and 16 may be bent diagonally outward above the base 12 at the points 17 and 18; and the ends of these leads, indicated at 19 and 20, are welded to a high resistance heater wire 21 of substantially V shape, for being energized with an electric current at constant B. t. u. input.

The heater wire 21 has two legs 22 and 23 joined at an apex 24; and it is the heater wire 21 which is cooled by the passage of the gases, such as air or other gases, the velocity of which is to be measured.

The leads 14 and 15 are for the purpose of supporting the thermocouple by means of which the temperature of the heater wire 21 is measured. The leads 14 and 15 are bent to extend diagonally at the points 25, 26, thus being spread away from each other; and the thermocouple 27 consists of a constantan wire 28 and a Chromel wire 29, these being joined at the hot junction 30 and at the cold junction 31.

The Chromel wire 29 is preferably in the form of a coil, thus increasing the length of the thermocouple and reducing the heat conduction from the hot junction to the cold junction of the thermocouple. Thus the coiled Chromel extends from the point 30 to the point 31; and a constantan wire 32 extends from the cold junction 31 to the lead 14.

The constantan wire 28 extends from the lead 26 to the hot junction 30 and has an additional extension 33 extending from the apex 30 or hot junction to the apex 24 of the heater wire 21. The wire extension 33 is also Chromel; and it serves to space the heater 21 from the hot junction 30, permitting the control of the sensitivity or slope of the MV curve.

The base 12 preferably supports a cap 34, which may be made of an insulating moldable material, such as a phenolic condensation compound. The cap 34 has a round base 35 of the same size as the round base 12; and the cap 34 has its base provided with a central bore 36 for passing the leads 13—16.

A Venturi frame 37 extends upwardly from the round base 35 by being integrally attached to the opposite sides of the round base 35. The Venturi frame 37 has a pair of opposite parallel sides 38, 39 joined by a partially circular end frame 40, thus forming an aperture or throat 11, which is oval and sufficiently elongated to surround the heater wire and thermocouple without engaging them.

The oval aperture 11 is to pass the air, the velocity of which is to be measured; and this aperture may have a straight side 40' at the lower end of Fig. 1 adjacent the leads.

The cross-sectional shape of the side frame members 38 and 39 and the circular end frame member 40 is arranged to taper outwardly from the points 41 and 42 in both directions like a Venturi tube; and the smallest part of the aperture in the plane of the points 41, 42 is the throat of the Venturi tube.

The frame members 38, 39, 40 are provided with curved surfaces 43 on the side toward the heater wire and thermocouple, these curved surfaces effecting and producing an enlargement of the aperture 11 outwardly from the points 41, 42.

The action of the Venturi opening is to increase the velocity of the gas flow through the opening 11 and to increase the sensitivity of the instrument by subjecting it to faster movement of the air passing over the heater wire and thermocouple. The sensitivity of the instrument without the Venturi frame about it may be as low as one third of that using the Venturi frame.

Referring to Fig. 3, this is a wiring diagram of the circuit, including the heater wire and thermocouple and suitable means for energizing them. This circuit preferably includes a battery 46, which is connected through an energizing manual switch 47 and a suitable resistance 48 with one terminal 16 of the heater wire 21. The other terminal 13 of the heater wire is connected by conductor 49 to an adjustable rheostat 50, which is used for adjusting the amount of heater current desired by means of a movable slider 51 engaging the rheostat coil 50.

The other terminal of the rheostat 50 is connected by conductor 52 to the other terminal of the battery 46. Thus the battery 46 is adapted to energize the heater wire 21 when the switch 47 is closed; and the amount of current may be adjusted by adjusting the rheostat 50.

The apex 24 of the heater wire is joined by the Chromel spacing wire 33 to the apex 30, which is also the hot junction of the thermocouple. The thermocouple is formed by the constantan wire 28 extending to the apex 30 and by the Chromel wire 29 extending backward from the apex 30 and provided with a constantan extension 32, which is connected to one side 53 of a meter 54 through a fixed resistor 65. The meter is preferably of the type having two scales and one pointer, and having its zero point at the left. The thermocouple is so connected to the meter, with respect to polarity, that the thermocouple E. M. F. drives the meter needle toward zero point.

Both scales are calibrated to read in gaseous or fluid velocity, such as feet per minute. For example, one scale may indicate 0 to 300 feet per minute, while the other may indicate 100 to 2,000 feet per minute. The scale is provided with a red line or other mark indicating the test point.

The coiled Chromel wire 29 is connected to constantan wire 32, which is connected to a range calibration resistor 65, having an intermediate tap, but having its end connected to one terminal of the meter 54. The other terminal of the meter 54 is connected through conductor 66 to the constantan wire 23, which has the Chromel extension 33 at the apex 30, leading to the heater wire apex 24.

The resistor 65 is actually a voltage multiplier and is connected to conductor 53 through switch 65a. The tap 55 is adapted to short circuit a part of this multiplier. When the entire resistance 65 is in circuit, the meter is in condition to use one scale. When the tap 55 is connected to the meter terminal, the circuit is in condition to use the other scale.

The meter is bridged by a damping resistor 58, which extends from one terminal 56 of the meter to the switch 59 adapted to effect connection to the other terminal 53 of the meter. When the switch 59 is closed with meter terminal 53, the circuit, including the resistance 58, acts to damp the pointer and stop its swinging, thus bringing the pointer to a stop. The damping resistor 58 is only employed in the circuit when a test point reading is being made.

The circuit preferably includes the test point calibration resistor 61, which is connected to one terminal of the resistor 48 and connected by conductor 60 to the meter terminal 53. The test point calibration resistor is bridged by the electrical suppression resistor 62 and switch 63, which is used to apply an additional counter E. M. F. to the voltage which is present in the meter, due to the output of the heated thermocouple. The addition of resistor 62 modifies the counter E. M. F. already applied by resistor 61.

The caloric input to the heater wire and hot junction is constant and is determined by adjusting heater current to the test point. Both the hot junction and the cold junction are inserted in the fluid stream, the velocity of which is to be measured. Both the hot junction and the cold junction are cooled or heated by the fluid medium, and the resulting thermocouple E. M. F. is dependent on the difference in temperature between the hot and cold junctions.

The millivolt temperature curve of a thermocouple may be assumed to be a straight line curve over a limited range. Thus temperature differences between hot and cold junctions are independent of the fluid temperature over a limited range.

In Fig. 4, $T_1$ may be the temperature of the cold junction and $T_1'$ may be the temperature of the hot junction. The corresponding millivolts are indicated as $MV_1$ and $MV_1'$. The temperature difference $T_1'$ minus $T_1$ produces the E. M. F. $MV_1'$ minus $MV_1$, for a given caloric input to the heater and a given gas temperature.

The counter E. M. F. supplied to the meter is of such a value to allow a full scale deflection of the meter for any given portion of the millivolt velocity curve shown in Fig. 5. In this figure the millivolt sensitivity of the meter represents only a small portion of the total millivolt output of the thermocouple for a given heater temperature. For example, Fig. 5 shows a curve in which millivolts are plotted against air velocity for a given heater temperature. The millivolt output of the thermocouple under no gas flow might be, for example, 6 millivolts. The full scale millivolt sensitivity of the meter and multiplier may be 4 millivolts.

For example, under zero fluid flow conditions, with the thermocouple heated, the voltage of the thermocouple would drive the pointer of the meter off the scale to the left. By applying a suppression voltage of 6 millivolts, of opposite polarity, the pointer will be driven back to zero. This is done by adjusting the suppression resistor 62.

Referring to Fig. 5, in this example the meter will be using the 2 to 6 millivolts range of the curve. At 6 millivolts velocity is zero. At 2 millivolts velocity is 300 feet per minute. Thus a full scale range of approximately 0 to 300 feet per minute velocity can be achieved in the example used. By suitable adjustments of resistors 65 and 62 it can be seen that any range and span of velocities may be measured.

The following is the theory of operation of the present instrument:

The cooling effect of the air on the hot wire is a function of the velocity of the fluid medium flowing past the heated wire. The simplified relation of these elements is $$T = \frac{k}{V^c}$$

There T is the temperature of the wire, V is the velocity of the fluid medium at that temperature and $k$ and $c$ are constants, depending on the medium, the temperature measuring device, and the heat transfer from the heated wire to the temperature measuring device, which is a thermocouple in the present case. The thermocouple measures differences in temperature in that the E. M. F. generated or the millivolt output of the thermocouple varies directly as the difference in temperature between its hot and cold junctions.

The heater wire is supplied with a constant B. t. u. input by adjusting its current by utilizing the test point indicator on the meter and adjusting the rheostat. The temperature coefficient of the heater wire is so small that it is negligible.

The hot junction of the thermocouple is connected to the heater wire by means of a Chromel extension; and the cold junction of the thermocouple is spaced away farther from the hot junction by having the Chromel wire coiled so that the heat from the heated wire does not influence the cold junction as a reference point by radiation or conduction.

Since both the hot and the cold junctions are disposed in the fluid medium stream, the fluid medium cools the hot junction and the cold junction; and the velocity reading, which is due to a change in temperature of the hot wire, is independent of the temperature of the fluid medium, as illustrated in Fig. 4.

The following is the method of use of the instrument:

The switches 47, 63, 55, 59 and 65a are all preferably embodied in one rotary switch which automatically provides the necessary sequence of operation.

Turning the switch to the test point position closes the switches 47 and 59. The switch 47 energizes the heater, while the switch 59 connects the damping resistor 58 in circuit with the meter 54. All the other switches are open to eliminate the effect of the thermocouple at this time.

With the switch in the test point position the rheostat 50 is adjusted until the heater current is indicated at the meter at the test point. The rheostat is left in this adjusted position to provide constant heat input to the heater wire and hot junction.

The rotary switch is next turned to the low range position, 0 to 300 feet per minute. This opens switch 59 and closes switch 65a and also closes switch 63. The switch 55 is still open.

Closing the switch 63 impresses a counter E. M. F. on the circuit for suppressing the E. M. F. generated by the thermocouple when the measuring element is out of the air stream.

It will thus be observed that I have invented an improved instrument and method of measuring the velocity of movement of a gaseous medium in which the velocity in feet per minute may be read directly on the scale.

The most important features of the invention are:

(1) The spacing of the hot junction from the heater wire by means of the extension 33 which connects it electrically, and permits the control of the slope of the characteristic curve of millivolts versus velocity by reducing the heat transfer from the heater wire to the hot junction.

(2) Coiling the Chromel wire which forms part of the thermocouple extending from the hot junction to the cold junction reduces the heat transfer from the hot junction to the cold junction, and increases the difference in temperature between the hot junction and the cold junction, increasing the sensitivity of the instrument.

(3) Mounting the measuring elements in a Venturi frame increases the velocity of the gaseous medium passing the heater wire and also increases the sensitivity of the instrument.

The air velocity may then be measured on the low range provided the needle does not go off scale. This is ascertained by inserting the measuring element in the stream of gas, the velocity of which is to be measured, and the velocity is directly indicated by the needle on the scale.

If the velocity is too high to be read on the scale, then the rotary switch is turned to the next position, which leaves all the other switches in the same position except that switch 55 is closed. Switch 55 has then connected in circuit only a portion of the multiplier 65 and the meter is connected for measurement on a higher scale, such as, for example, 100 feet per minute to 2,000 feet per minute.

The present instrument is simple in construction, accurate in its readings, adapted to retain its calibration, and gives indications directly in feet per minute velocity of the gaseous medium which is passing in a stream around the heater wire.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a thermal anemometer, the combination of a supporting insulating base with a plurality of conductor leads extending through the base for connection to an external circuit, two of said leads supporting a rigid, outwardly extending electric heater wire, the two of said leads supporting a pair of thermocouple wires joined together at one end to form a hot junction adjacent the heater wire, and the same two thermocouple wires being provided with a cold junction remote from said heater wire, and means for connecting the hot junction electrically and in heat transfer relation to said heater wire, the said heater wire being in the form of an inverted V-shaped member and the said thermocouple wires forming a second and smaller V-shape, and having its apex disposed beyond the hot junction of the thermocouple wires, said hot junction being joined to said apex for effecting a heat transfer, one of said thermocouple wires comprising a coiled wire of Chromel, the said Chromel wire being tightly coiled for increasing its length between the hot junction and the cold junction and reducing the heat transfer from the heater to the cold junction.

2. In a thermal anemometer, the combination of a supporting insulating base with a plurality of conductor leads extending through the base for connection to an external circuit, two of said leads supporting a rigid, outwardly extending electric heater wire, the two of said leads supporting a pair of thermocouple wires joined together at one end to form a hot junction adjacent the heater wire, and the same two thermocouple wires being provided with a cold junction remote from said heater wire, and means for connecting the hot junction electrically and in heat transfer relation to said heater wire, the said heater wire being in the form of an inverted V-shaped member and the said thermocouple wires forming a second and smaller V-shape, and having its apex disposed beyond the hot junction of the thermocouple wires, said hot junction being joined to said apex for effecting a heat transfer, one of said thermocouple wires comprising a coiled wire of Chromel, the said Chromel wire being tightly coiled for increasing its length between the hot junction and the cold junction and reducing the heat transfer from the heater to the cold junction, and said heater wire and thermocouple being surrounded by a Venturi frame having an opening tapered outwardly, and having a throat at which the heater wire is located for increasing the velocity of the air and the sensitivity of the anemometer.

3. A thermal anemometer comprising a supporting base of insulating material and a rigid resistance wire forming an elongated heater assembly of substantially V shape having both its ends carried by said base and its apex located in spaced relation to said base, a thermocouple comprising first and second wires of dissimilar metal joined together at a hot junction which is supported by said apex, the other ends of said thermocouple wires being supported by said base, forming an elongated substantially V-shaped thermocouple assembly inside the heater wire assembly, the thermocouple assembly also including a third wire of metal similar to the second wire and extending from the base to said first thermocouple wire, forming a cold junction at the adjacent end of said first wire, the heater wire and thermocouple wires being located substantially in the same plane, and the hot junction being heated to a predetermined temperature by conduction of heat from the apex of said heater wire, all of said wires being subjected to the flow of air, reducing the temperature of both junctions and effecting a change in the temperature difference between the hot and cold junctions, which results in a change in the E. M. F. generated by the thermocouple that is a measure of the air velocity, the said first wire also extending from the hot junction to the apex of the heater wire, providing an extension which supports the thermocouple from the apex and conducts a lesser amount of heat to the hot junction for the purpose of varying the sensitivity of the galvanometer.

4. A thermal anemometer comprising a supporting base of insulating material and a rigid resistance wire forming an elongated heater assembly of substantially V shape having both its ends carried by said base and its apex located in spaced relation to said base, a thermocouple comprising first and second wires of dissimilar metal joined together at a hot junction which is supported by said apex, the other ends of said thermocouple wires being supported by said base, forming an elongated, substantially V-shaped thermocouple assembly inside the heater wire assembly, the thermocouple assembly also including a third wire of metal similar to the second wire and extending from the base to said first thermocouple wire, forming a cold junction at the adjacent end of said first wire, the heater wire and thermocouple wires being located substantially in the same plane, and the hot junction being heated to a predetermined temperature by conduction of heat from the apex of said heater wire, all of said wires being subjected to the flow of air, reducing the temperature of both junctions and effecting a change in the temperature difference between the hot and cold junctions, which results in a change in the E. M. F. generated by the thermocouple that is a measure of the air velocity, the said first wire being formed with a multiplicity of helical turns between the hot junction and the cold junction, increasing the over-all length of the first thermocouple wire and reducing heat conduction from the hot junction to the cold junction, while increasing the temperature difference and generated E. M. F. of the thermocouple, the said third wire extending from the cold junction to the base, also being formed in a helix.

5. A thermal anemometer comprising a supporting base of insulating material and a rigid resistance wire forming an elongated heater assembly of substantially V shape having both its ends carried by said base and its apex located in spaced relation to said base, a thermocouple comprising first and second wires of dissimilar metal joined together at a hot junction which is supported by said apex, the other end of said thermocouple wires being supported by said base, forming an elongated, substantially V-shaped thermocouple assembly inside the heater wire assembly, the thermocouple assembly also including a third wire of metal similar to the second wire and extending from the base to said first thermocouple wire, forming a cold junction at the adjacent end of said first wire, the heater wire and thermocouple wires being located substantially in the same plane, and the hot junction being heated to a predetermined temperature by conduction of heat from the apex of said heater wire, all of said wires being subjected to the flow of air, reducing the temperature of both junctions and effecting a change in the temperature difference between the hot and cold junctions, which results in a change in the E. M. F. generated by the thermocouple that is a measure of the air velocity, the said base supporting a frame having a pair of parallel sides and a round end portion about said heater wire and thermocouple, the said frame being formed on its air inlet and air outlet sides with curved surfaces acting like the openings of a venturi for increasing the velocity of the air as it passes said wires and increasing the sensitivity of the anemometer.

6. A thermal anemometer comprising, a supporting base of insulating material and an electrical resistance wire forming a heater and having both its ends carried by said base, a thermocouple comprising a pair of thermocouple wires of dissimilar metal joined together at a hot junction, and having the hot junction in heat conducting electrical connection to said heater wire, a source of direct current arranged to be connected to the terminals of said heater, a meter arranged to be connected across the thermocouple terminals, a second source of E. M. F. comprising a resistor connected in series with said heater and connected to apply the voltage drop of one half of said heater and the resistor to the meter and thermocouple in such polarity as to equally oppose the voltage output of the thermocouple for a no-flow condition, the thermocouple also having a cold junction carried by said support, and the heater wire and thermocouple being both subjected to the cooling effect of a gaseous medium passing about them, reducing the thermocouple output, which is no longer equal and opposite to the second source of E. M. F., and causing the meter to indicate fluid velocity in response to the differential between the thermocouple voltage and said E. M. F., the said thermocouple wires comprising a wire of constantan and a wire of Chromel, which is tightly coiled throughout its length, for increasing its length between the hot junction and cold junction, and reducing heat transfer from the heater to the cold junction, the said Chromel wire being connected at its end remote from the hot junction to a tightly coiled constantan wire to provide a cold junction adjacent to the hot junction, the said heater wire being in the form of an inverted, rigid V-shaped member, and the thermocouple wires forming a second and smaller V-shape with the apices of the heater and thermocouple joined and the thermocouple supported by the heater wire.

7. A thermal anemometer comprising, a supporting base of insulating material and an electrical resistance wire forming a heater and having both its ends carried by said base, a thermocouple comprising a pair of thermocouple wires of dissimilar metal joined together at a hot junction, and having the hot junction in heat conducting electrical connection to said heater wire, a source of direct current arranged to be connected to the terminals of said heater, a meter arranged to be connected across the thermocouple terminals, a second source of E. M. F. comprising a resistor connected in series with said heater and connected to apply the voltage drop of one half of said heater and the resistor to the meter and thermocouple in such polarity as to equally oppose the voltage output of the thermocouple for a no-flow condition, the thermocouple also having a cold junction carried by said support, and the heater wire and thermocouple being both subjected to the cooling effect of a gaseous medium passing about them, reducing the thermocouple output, which is no longer equal and opposite to the second source of E. M. F., and causing the meter to indicate fluid velocity in response to the differential between the thermocouple voltage and said E. M. F., the said thermocouple wires comprising a wire of constantan and a wire of Chromel, which is tightly coiled throughout its length, for increasing its length between the hot junction and cold junction, and reducing heat transfer from the heater to the cold junction, the said Chromel wire being connected at its end remote from the hot junction to a tightly coiled constantan wire to provide a cold junction adjacent to the hot junction, the said heater wire and thermocouple being disposed inside a venturi frame having an opening tapered outwardly and having a throat at which the wires are located substantially in the same plane, for increasing the velocity of the air and the sensitivity of the anemometer.

References Cited in the file of this patent

UNITED STATES PATENTS

| | | |
|---|---|---|
| 1,996,943 | Wile | Apr. 9, 1935 |
| 2,269,019 | Hall | Jan. 6, 1942 |
| 2,314,877 | Hall | Mar. 30, 1943 |
| 2,389,615 | Eder | Mar. 30, 1943 |
| 2,594,618 | Booth | Apr. 29, 1952 |
| 2,627,182 | Quereau et al. | Feb. 3, 1953 |

OTHER REFERENCES

"Shielded Hotwire Anemometer," Simmons, in Journal of Scientific Instruments and Physics in Industry, vol. 26, No. 12, p. 407, December 1949.